(12) United States Patent
Liu et al.

(10) Patent No.: US 10,493,584 B2
(45) Date of Patent: Dec. 3, 2019

(54) METHOD FOR DETERMINING LOCATIONS OF SUPPORTING POINTS FOR A MACHINE TOOL

(71) Applicant: NATIONAL CHUNG CHENG UNIVERSITY, Chiayi County (TW)

(72) Inventors: De-Shin Liu, Chiayi County (TW); Zhen-Wei Zhuang, Chiayi County (TW); Jen-Chang Lu, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 21 days.

(21) Appl. No.: 16/038,378

(22) Filed: Jul. 18, 2018

(65) Prior Publication Data
US 2019/0262959 A1    Aug. 29, 2019

(30) Foreign Application Priority Data

Feb. 26, 2018    (TW) .............................. 107106381 A (51) Int. Cl.
*B23Q 11/00* (2006.01)
*B23Q 16/00* (2006.01)

(52) U.S. Cl.
CPC .......... *B23Q 16/005* (2013.01); *B23Q 11/001* (2013.01); *B23Q 2220/006* (2013.01); *B23Q 2716/00* (2013.01)

(58) Field of Classification Search
CPC ................ B23Q 16/005; B23Q 11/001; B23Q 2220/006; B23Q 2716/00; B23Q 17/22; B23D 33/10; B23D 55/043
See application file for complete search history.

*Primary Examiner* — Lee A Holly
(74) *Attorney, Agent, or Firm* — Michael Best & Friedrich LLP (57) ABSTRACT

A method for determining locations of supporting points for a machine tool is proposed. Multiple test coordinate sets in relation to the machine tool are used in cooperation with corresponding deformation index values for multiple components of the machine tool to obtain a deformation index equation that relates to assessed deformation of the components in response to different coordinates for the supporting points. The deformation index equation is used to acquire an optimal coordinate set for the supporting points.

9 Claims, 9 Drawing Sheets

METHOD FOR DETERMINING LOCATIONS OF SUPPORTING POINTS FOR A MACHINE TOOL

CROSS-REFERENCE TO RELATED APPLICATION

This application claims priority of Taiwanese Invention Patent Application No. 107106381, filed on Feb. 26, 2018.

FIELD

The disclosure relates to a method for determining locations associated with a three-point support configuration, and more particularly to a method for determining locations of supporting points for a machine tool.

BACKGROUND

Machine leveling plays an importable role in the stability and precision of machine tooling. Conventional machine tools have many points in contact with the ground, adversely affecting machine leveling. A three-point support configuration may promote stability and precision for machine tools because three points cooperatively determine a plane, which is advantageous in machine leveling.

Conventionally, designers may use software tools to perform simulation for several candidate location combinations for the three supporting points for the machine tool, so as to find out an optimal location combination for the supporting points among the candidate combinations. However, since the candidate combinations are usually determined by the designers based on experience, the acquired optimal combination may not be the best choice among all possible location combinations.

SUMMARY

Therefore, an object of the disclosure is to provide a method that can alleviate at least one of the drawbacks of the prior art.

According to the disclosure, a method for determining locations of supporting points for a machine tool is proposed. The machine tool includes a base provided with a guide rail unit, and a plurality of components disposed on the base. The method is implemented by a computer device that stores a machine tool model, component weight information, a first coordinate interval, a second coordinate interval and a third coordinate interval.

The machine tool model relates to the machine tool and includes a plurality of model members respectively corresponding to the base and the components of the machine tool. The model members include a guide rail member unit that corresponds to the guide rail unit.

The component weight information is provided for the model members, and relates to weights of the base and the components of the machine tool.

The first coordinate interval is defined with respect to a first axis in relation to the machine tool model, and relates to a location of a first supporting point to be determined for the machine tool model with respect to the first axis.

The second coordinate interval is defined with respect to the first axis, and relates to locations of a second supporting point and a third supporting point to be determined for the machine tool model with respect to the first axis.

The third coordinate interval is defined with respect to a second axis transverse to the first axis in relation to the machine tool model, and relates to locations of the second and third supporting points for the machine tool model with respect to the second axis.

The method includes steps of: acquiring a plurality of test coordinate sets for the first, second and third supporting points based on the first coordinate interval, the second coordinate interval and the third coordinate interval, each of the test coordinate sets including multiple coordinate values that conform to the first, second and third coordinate intervals, respectively; calculating, by the computer device for each of the test coordinate sets, a first deformation index value that corresponds to the guide rail member unit and that relates to assessment of a deformation level of the guide rail unit based on the test coordinate set, the machine tool model and the component weight information; acquiring, by the computer device and based on the test coordinate sets and the corresponding first deformation index values, a first deformation index equation that is used to calculate a first assessed deformation index value in response to an arbitrary coordinate set for the first, second and third supporting points; calculating, by the computer device, an optimal coordinate set for the first, second and third supporting points based on the first deformation index equation, the optimal coordinate set corresponding to a minimum first assessed deformation index value with respect to the first deformation index equation; and installing support components for the machine tool respectively at the first, second and third supporting points corresponding to the optimal coordinate set.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
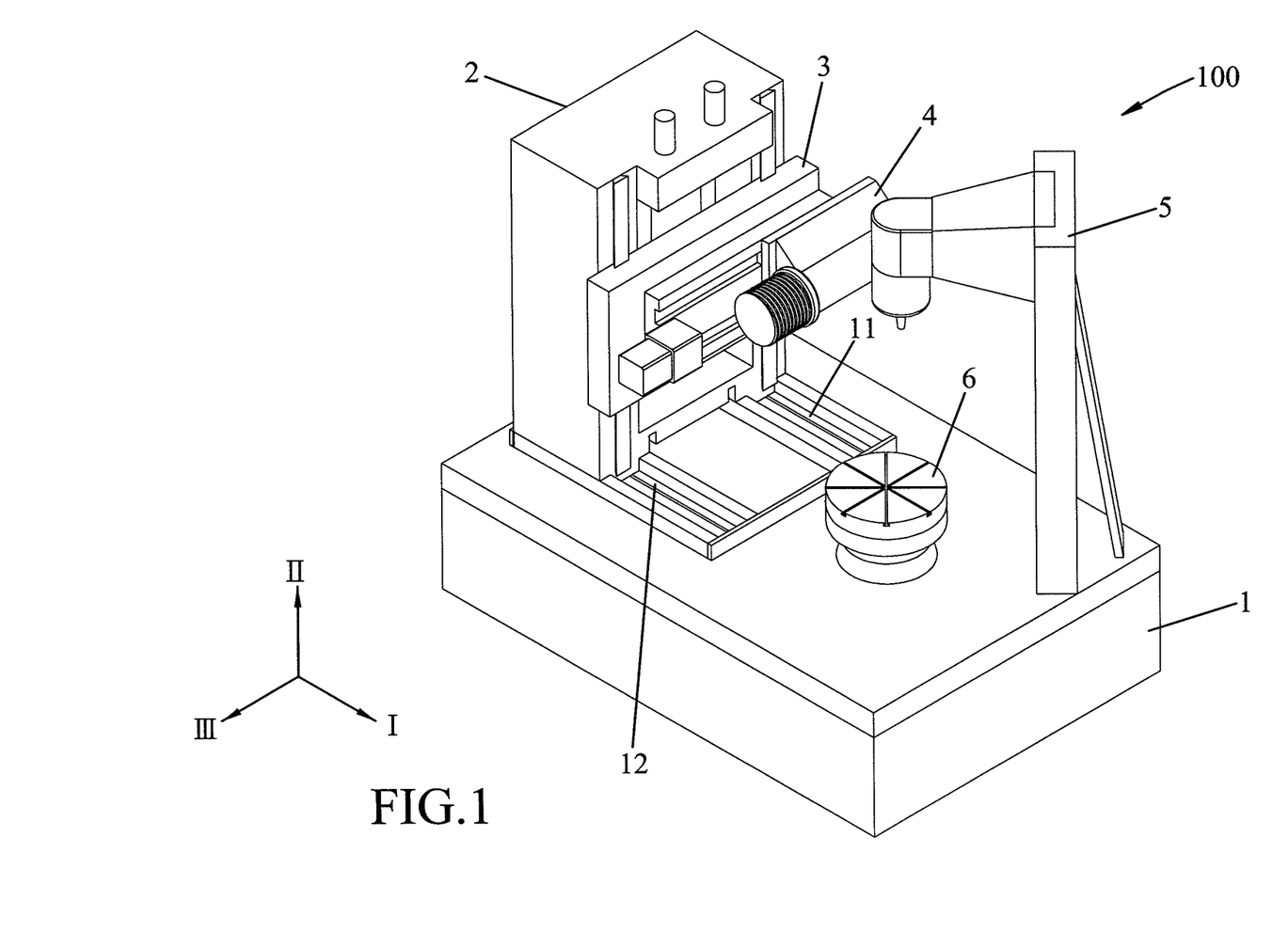
FIG. 1 is a schematic perspective view illustrating an exemplary machine tool adapted for the embodiment for determining locations of supporting points according to the disclosure.

FIG. 1 exemplarily shows a machine tool 100 which is adapted for the embodiment of the method for determining locations of supporting points of a machine tool. The machine tool 100 includes a base 1 and a plurality of components disposed on the base 1. The base 1 may have a first surface facing toward the ground, and a second surface opposite to the first surface and provided with a guide rail unit that includes a first guide rail 11 and a second guide rail 12. The components may include an upright 2 that is movable relative to the base 1 along the first and second guide rails 11, 12 in a first direction (I), a spindle slide base 3 that is mounted to a side surface of the upright 2 and movable relative to the upright 2 in a second direction (II), a spindle box 4 that is mounted to and movable relative to the spindle slide base 3 in a third direction (III), a tailstock 5 fixed to the second surface of the base 1, and a work table 6 fixed to the second surface of the base 1, where the first, second and third directions (I, II, III) are transverse to each other. It should be noted that the method for determining locations of supporting points according to this disclosure is applicable to a variety of machine tools, and is not limited to the machine tool 100, which is exemplarily used in this embodiment.

Figure 2:
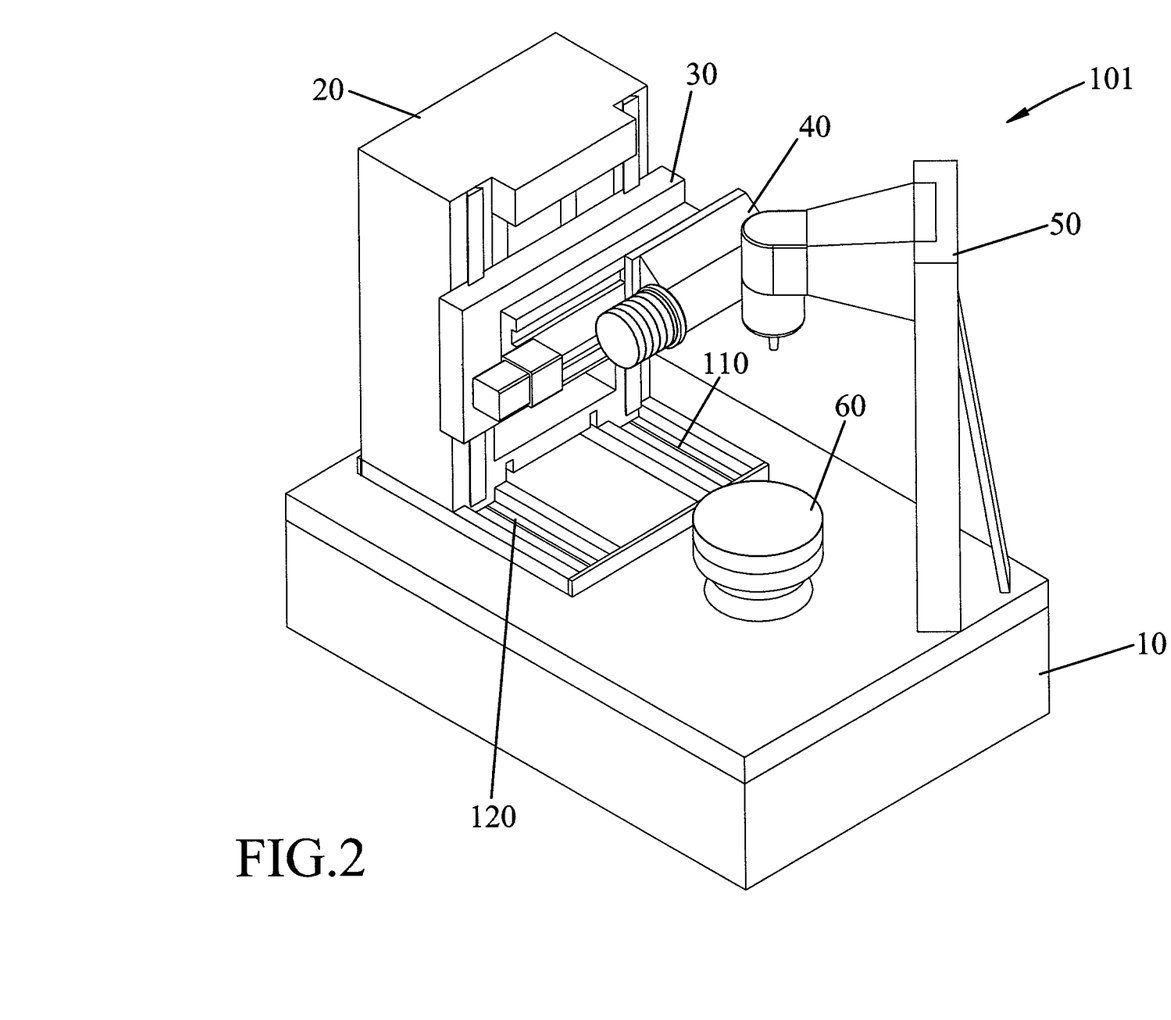
FIG. 2 is a schematic diagram illustrating a machine tool model in a three dimensional manner.
Figure 3:
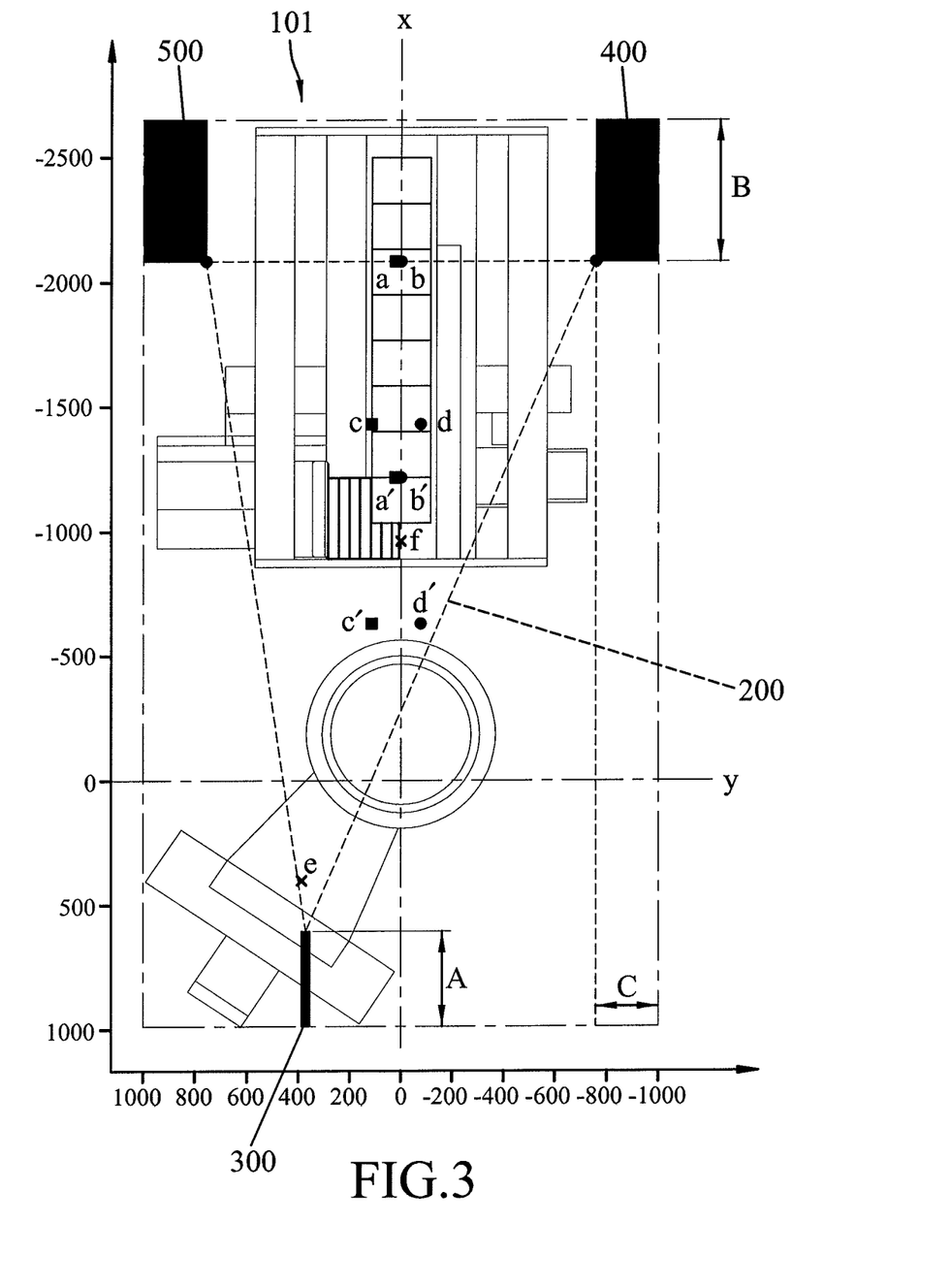
FIG. 3 is a schematic diagram illustrating the machine tool model in a bottom view, showing first to tenth mass center locations, a three-point range and adjustment regions for first to third supporting points.

The embodiment of the method for determining locations of supporting points for the machine tool 100 is implemented using a computer device (not shown), such as a desktop computer, a notebook computer, etc., but this disclosure is not limited in this respect. Referring to FIG. 2, the computer device stores a simplified machine tool model 101 relating to the machine tool 100. In FIG. 2, the machine tool model 101 is represented in a form of a three-dimensional model, but this disclosure is not limited in this respect. The machine tool model 101 includes a plurality of model members, which include a base member 10, an upright member 20, a spindle slide base member 30, a spindle box member 40, a tailstock member 50 and a work table member 60 respectively corresponding to the base 1 and the components 2, 3, 4, 5, 6 of the machine tool 100. The base member 10 that corresponds to the base 1 has a guide rail member unit corresponding to the guide rail unit and including first and second guide rail members 110, 120 respectively corresponding to the first guide rail 11 and the second guide rail 12. Moreover, the computer device further stores component weight information for the model members 10, 20, 30, 40, 50, 60 (hereinafter short for "10-60"), a first coordinate interval, a second coordinate interval and a third coordinate interval. The component weight information relates to weights of the base 1 and the components 2-6 of the machine tool 100. Referring to FIG. 3, which shows the machine tool model 101 from a bottom view, the first coordinate interval (A) is defined with respect to a first axis (x) that is defined based on the machine tool model 101, and relates to a location of a first supporting point to be determined for the machine tool model 101 with respect to the first axis (x). In this embodiment, the base member 10 is substantially a rectangle from the bottom view, and the first axis (x) is defined as an axis passing through two central points of two opposite edges of the rectangle. It is noted that a location of the first supporting point with respect to a second axis (y) is fixed, where the second axis (y) is defined in relation to the machine tool model 101, is transverse to the first axis (x), and cooperates with the first axis (x) to define a coordinate system. In other words, the first supporting point has an x-axis coordinate value between an upper limit and a lower limit of the first coordinate interval (A), and a fixed y-axis coordinate value. The second coordinate interval (B) is defined with respect to the first axis (x), and relates to locations of a second supporting point and a third supporting point to be determined for the machine tool model 101 with respect to the first axis (x). The third coordinate interval (C) is defined with respect to the second axis (y), and relates to locations of the second and third supporting points for the machine tool model 101 with respect to the second axis (y). In other words, the second supporting point has an x-axis coordinate value between an upper limit and a lower limit of the second coordinate interval (B), and a y-axis coordinate value between an upper limit and a lower limit of the third coordinate interval (C). It is noted that, in this embodiment, the second supporting point and the third supporting point are symmetric with respect to the first axis (x). Accordingly, the second and third supporting points have the same x-axis coordinate value and opposite y-axis coordinate values with reference to the first axis (x).

In this embodiment, the computer device may be operated to execute one or more computer programs (e.g., SolidWorks, a CAD software program developed by Dassault Systèmes Solidworks Corporation) to perform a coordinate interval acquiring procedure that includes steps 50 to 54 (see FIG. 4) for acquiring and storing the machine tool model 101 (see FIG. 2), the weight information and the first, second and third coordinate intervals.

Figure 4:
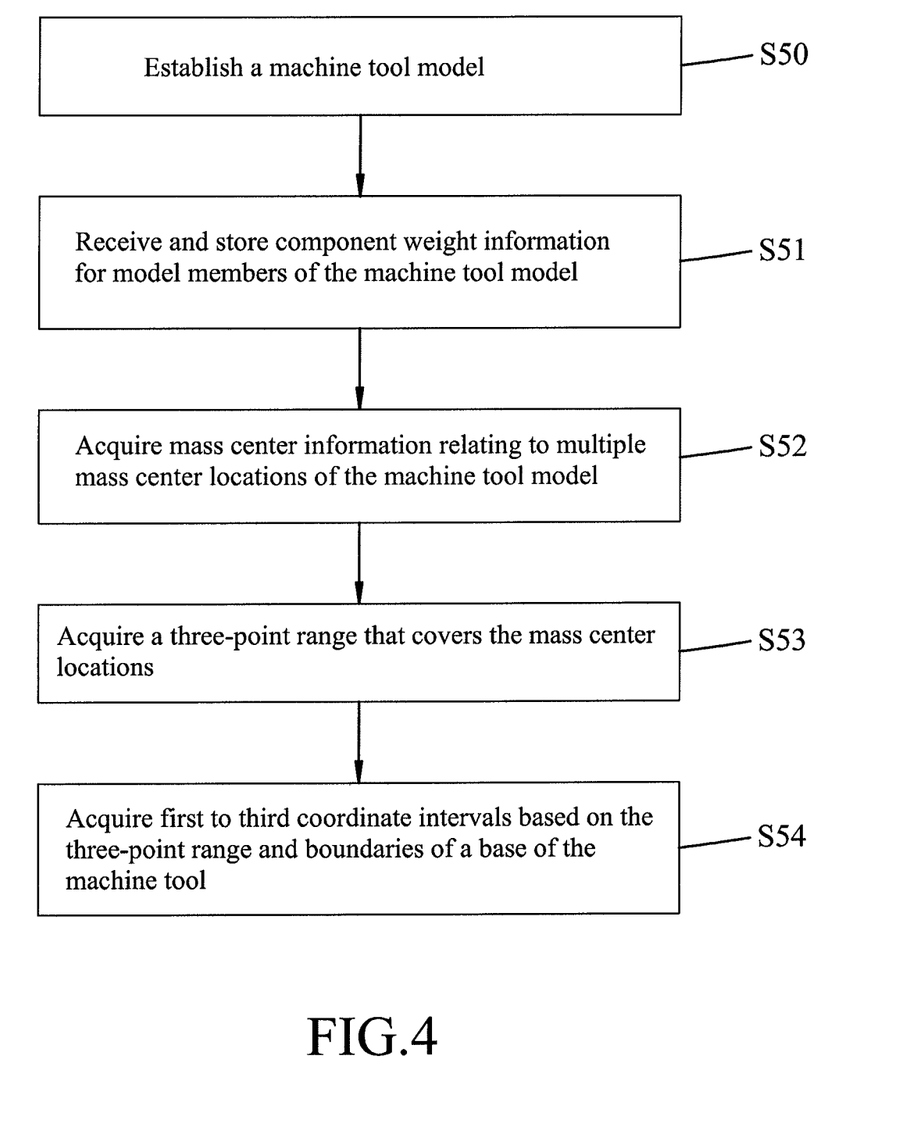
FIG. 4 is a flow chart illustrating steps of a coordinate interval acquiring procedure of the embodiment.

Referring to FIGS. 2 and 4, in step S50, the computer device establishes and stores the machine tool model 101 based on user input data relating to the machine tool 100. In this embodiment, the machine tool model 101 is a simplified model that includes only the model members (e.g., the model members 10-60) that correspond to primary structures of the machine tool 100 such as the base 1, the upright 2, the spindle slide base 3, the spindle box 4, the tailstock 5 and the work table 6 (see FIG. 1), and does not include complicated or detailed structure such as lightning holes, apertures, etc., but this disclosure is not limited in this respect.

In step S51, the computer device receives user input of the component weight information for the model members of the machine tool model 101, and stores the same.

In step S52, the computer device acquires mass center information relating to the machine tool model 101 based on the machine tool model 101 and the component weight information. The mass center information includes first mass center information relating to the upright 2, the spindle slide base 3 and the spindle box 4, second mass center information relating to the spindle slide base 3 and the spindle box 4, third mass center information relating to the tailstock 5 and the work table 6, and fourth mass center information relating to the base 1. Referring to FIG. 3, in this embodiment, the first mass center information includes a first mass center location (a), a second mass center location (b), a third mass center location (a'), and a fourth mass center location (b'); the second mass center information includes a fifth mass center location (c), a sixth mass center location (d), a seventh mass center location (c'), and an eighth mass center location (d'). The computer device simulates a first condition in which the upright member 20 is at a location farthest from the work table member 60, and the spindle box member 40 is at a location farthest from the first guide rail member 110 to obtain: the first mass center location (a) in relation to the upright member 20, the spindle slide base member 30 and the spindle box member 40 (i.e., a location of a center of mass of a combination of the upright member 20, the spindle slide base member 30 and the spindle box member 40); and the fifth mass center location (c) in relation to the spindle slide base member 30 and the spindle case member 40 (i.e., a location of a center of mass of a combination of the spindle slide base member 30 and the spindle box member 40). The computer device simulates a second condition in which the upright member 20 is at a location farthest from the work table member 60, and the spindle box member 40 is at a location farthest from the second guide rail member 120 to obtain: the second mass center location (b) in relation to the upright member 20, the spindle slide base member 30 and the spindle box member 40; and the sixth mass center location (d) in relation to the spindle slide base member 30 and the spindle case member 40. The computer device simulates a third condition in which the upright member 20 is at a location closest to the work table member 60, and the spindle box member 40 is at a location farthest from the first guide rail member 110 to obtain: the third mass center location (a') in relation to the upright member 20, the spindle slide base member 30 and the spindle box member 40; and the seventh mass center location (c') in relation to the spindle slide base member 30 and the spindle case member 40. The computer device simulates a fourth condition in which the upright member 20 is at a location closest to the work table member 60, and the spindle box member 40 is at a location farthest from the second guide rail member 120 to obtain: the fourth mass center location (b') in relation to the upright member 20, the spindle slide base member 30 and the spindle box member 40; and the eighth mass center location (d') in relation to the spindle slide base member 30 and the spindle case member 40. In addition, the third mass center information includes a ninth mass center location (e) relating to the tailstock member 50 and the work table member 60 (i.e., a location of a center of mass of a combination of the tailstock member 50 and the work table member 60), and the fourth mass center information includes a tenth mass center location (f) relating to the base 10 (i.e., a location of a center of mass of the base member 10), where the ninth and tenth mass center locations (e), (f) may be calculated directly based on the machine tool model 101 and the component weight information.

Figure 5:
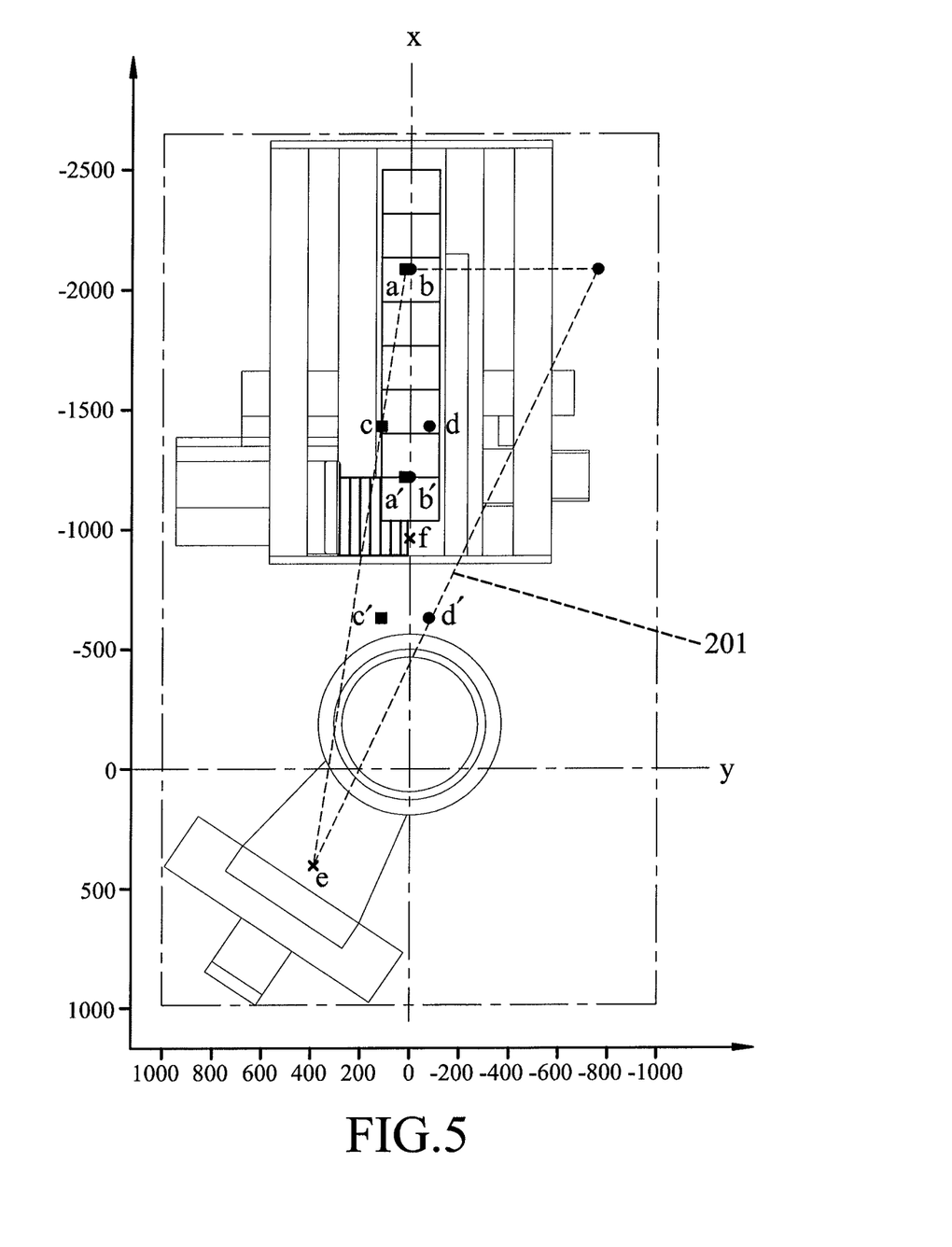
FIG. 5 is a schematic diagram illustrating a first step for determining the three-point range for the first to third supporting points.
Figure 6:
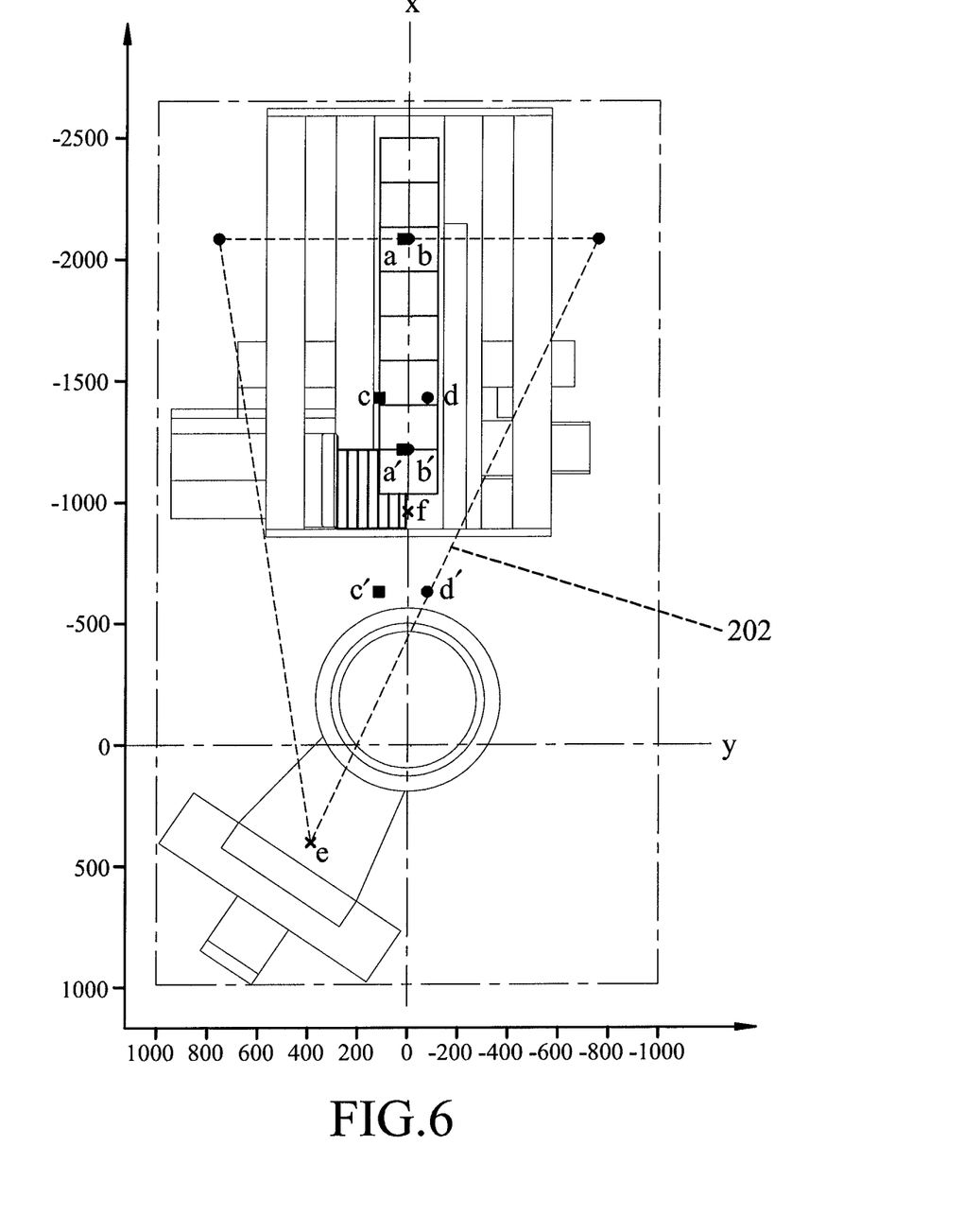
FIG. 6 is a schematic diagram illustrating a second step for determining the three-point range for the first to third supporting points.

In step S53, the computer device receives user inputs to acquire a three-point range 200 (see FIG. 3) that covers the first to tenth mass center locations (a, b, a', b', c, d, c', d', e, f) (i.e., all of the first to tenth mass center locations (a, b, a', b', c, d, c', d', e, f) fall within the three-point range 200). The three-point range 200 may be determined based on multiple factors. At the beginning, a smaller first range 201 (see FIG. 5) that covers the first to tenth mass center locations (a, b, a', b', c, d, c', d', e, f) may be obtained directly from the first to tenth mass center locations (a, b, a', b', c, d, c', d', e, f). In consideration of balancing with respect to the base 1 that corresponds to the base member 10, the first range 201 is modified to acquire a second range 202 (see FIG. 6) that has better symmetry and that achieves better balance for the base 1. Further considering flexibility of design, the second range 202 may be modified to obtain the three-point range 200, as shown in FIG. 3.

Referring to FIGS. 2 and 3, in step S54, the computer device acquires and stores the first, second and third coordinate intervals (A, B, C) based on the three-point range 200 and boundaries of the base 1. In this embodiment, the first coordinate interval (A) is denoted by (724.627, 975), representing a range from 724.627 to 975 for x-axis coordinate values; the second coordinate interval (B) is denoted by (−2650, −2057.14), representing a range from −2650 to −2057.14 for x-axis coordinate values; and the third coordinate interval (C) is denoted by (−925, −749.399), representing a range from −925 to −749.399 for y-axis coordinate values. The first coordinate interval (A) defines an adjustment region 300 for the first supporting point, and the second and third coordinate intervals (B, C) cooperatively define adjustment regions 400, 500 for the second and third supporting points, respectively. In this embodiment, for the first supporting point, the x-axis coordinate value is defined between 724.627 and 975, while the y-axis coordinate value is fixed; for the second supporting point, the x-axis coordinate value is defined between −2650 and −2057.14, and the y-axis coordinate value is defined between −925 and −749.399; and, for the third supporting point that is symmetric to the second supporting point with respect to the first axis (x), the x-axis coordinate value is defined between −2650 and −2057.14, and the y-axis coordinate value is defined between 749.399 and 925.

Figure 7:
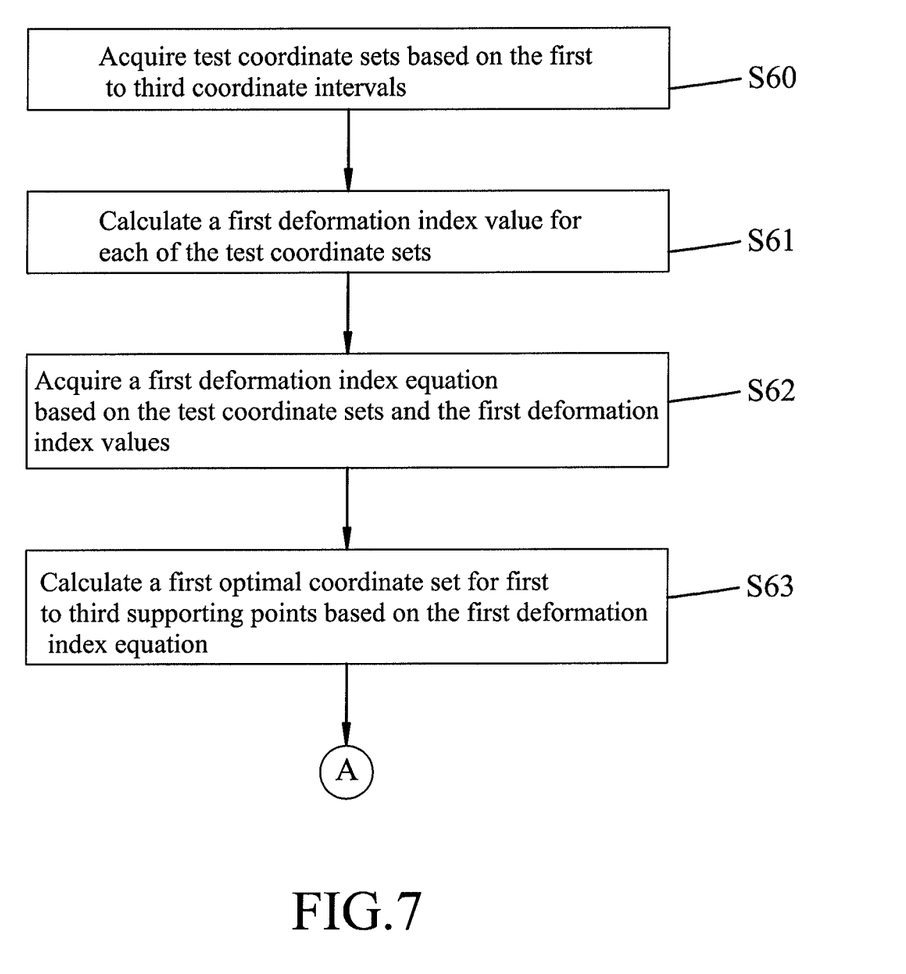
FIGS. 7 and 8 cooperatively form a flow chart illustrating steps of a supporting point determining procedure of the embodiment.
Figure 8:
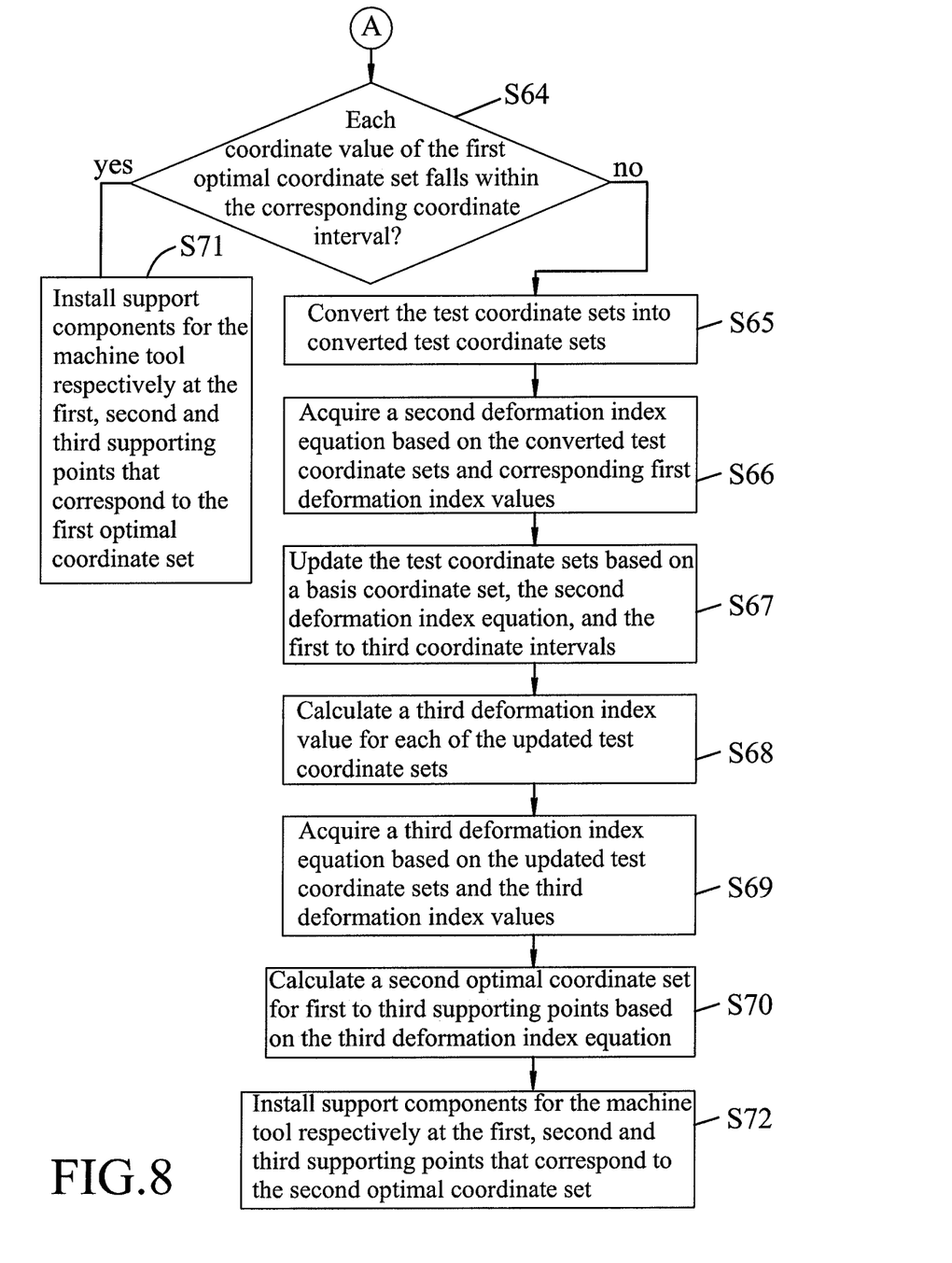

Referring to FIGS. 7 and 8, the computer device may be operated to execute one or more computer programs to perform a supporting point determining procedure that includes steps S60-S71 for determining coordinates of the first, second and third supporting points with respect to the machine tool model 101.

In step S60, multiple test coordinate sets are acquired based on the first, second and third coordinate intervals using, but not limited to, central composite design (CCD). Each of the test coordinate sets includes multiple (three) coordinate values which respectively conform to the first, second and third coordinate intervals and which are respectively denoted by "Ax", "Bx" and "By", as listed in Table 1. In other words, $724.627 \leq Ax \leq 975$, $-2650 \leq Bx \leq -2057.14$, and $-925 \leq By \leq -749.399$. It is noted that, in this embodiment, each of the coordinate values of each of the test coordinate sets is related to at least one of an upper limit or a lower limit of the corresponding one of the first, second and third coordinate intervals, but this disclosure is not limited in this respect. It is noted that, in Table 1, the coordinate value "849.814" in the "Ax" column is an average of the upper limit (i.e., 975.000) and the lower limit (i.e., 724.627) of the first coordinate interval; the coordinate value "−2353.57" in the "Bx" column is an average of the upper limit (i.e., −2057.14) and the lower limit (i.e., −2650.00) of the second coordinate interval; and the coordinate value "−837.200" in the "By" column is an average of the upper limit (i.e., −749.399) and the lower limit (i.e., −925.000) of the third coordinate interval.

TABLE 1

| Test coordinate Set No. | Ax' | Bx' | By' | Ax | Bx | By | Z |
|---|---|---|---|---|---|---|---|
| 1 | −1 | −1 | −1 | 724.627 | −2650.00 | −925.000 | 29.4983 |
| 2 | 1 | −1 | −1 | 975.000 | −2650.00 | −925.000 | 37.2349 |
| 3 | −1 | 1 | −1 | 724.627 | −2057.14 | −925.000 | 10.0060 |
| 4 | 1 | 1 | −1 | 975.000 | −2057.14 | −925.000 | 14.1967 |
| 5 | −1 | −1 | 1 | 724.627 | −2650.00 | −749.399 | 30.7929 |
| 6 | 1 | −1 | 1 | 975.000 | −2650.00 | −749.399 | 38.2714 |
| 7 | −1 | 1 | 1 | 724.627 | −2057.14 | −749.399 | 11.7637 |
| 8 | 1 | 1 | 1 | 975.000 | −2057.14 | −749.399 | 15.7362 |
| 9 | −1 | 0 | 0 | 724.627 | −2353.57 | −837.200 | 22.6520 |
| 10 | 1 | 0 | 0 | 975.000 | −2353.57 | −837.200 | 28.3520 |
| 11 | 0 | −1 | 0 | 849.814 | −2650.00 | −837.200 | 33.4694 |
| 12 | 0 | 1 | 0 | 849.814 | −2057.14 | −837.200 | 12.7737 |
| 13 | 0 | 0 | −1 | 849.814 | −2353.57 | −925.000 | 24.7802 |
| 14 | 0 | 0 | 1 | 849.814 | −2353.57 | −749.399 | 25.8426 |
| 15 | 0 | 0 | 0 | 849.814 | −2353.57 | −837.200 | 25.1893 |

In step S61, the computer device uses, but not limited to, finite element static force analysis to calculate, for each of the test coordinate sets, a first deformation index value that corresponds to the guide rail member unit (i.e., the first and second guide rail members 110, 120) and that relates to assessment of a deformation level of the guide rail unit (i.e., the first and second guide rails 11, 12) based on the test coordinate set, the machine tool model 101 and the component weight information. The first deformation index value for each of the test coordinate sets is denoted by "Z", as listed in Table 1. In this embodiment, the computer device executes a computer program "ANSYS Workbench" to perform the finite element static force analysis, but this disclosure is not limited in this respect. In this embodiment, a plurality of deformation values for each of the test coordinate sets may be calculated based on different placements of the model members 20, 30, 40, and the first deformation index value (Z) for each of the test coordinate sets is defined as a difference between the largest one and the smallest one of the deformation values calculated for the test coordinate set.

In step S62, the computer device uses, but not limited to, response surface methodology (see Equation (1), which is a formula commonly used in response surface methodology) to acquire, based on the test coordinate sets and the corresponding first deformation index values, a first deformation index equation that is used to calculate a first assessed deformation index value in response to an arbitrary coordinate set for the first, second and third supporting points.

$$Y = \beta_0 + \sum_{i=1}^{k} \beta_i X_i + \sum_{i=1}^{k} \beta_{ii} X_i^2 + \sum\sum_{i<j} \beta_{ij} X_i X_j \quad (1)$$

where the parameter Y represents the first deformation index values, and the parameter Xi, Xj represents coordinates of points corresponding to the test coordinate sets in this embodiment.

In this embodiment, the acquired first deformation index equation is represented by:

$$Z = -124.35 - 0.06655 \times A_x - 0.12439 \times B_x + 0.0402 \times B_y - \quad (2)$$
$$0.000024 \times A_x \times B_x - 0.000006 \times A_x \times B_x + 0.000005 \times B_x \times B_y +$$
$$0.000017 \times A_x \times A_x - 0.000024 \times B_x \times B_x + 0.00001 \times B_y \times B_y$$

In step S63, the computer device uses an optimization algorithm to calculate a first optimal coordinate set for the first, second and third supporting points based on the first deformation index equation, where the first optimal coordinate set corresponds to a minimum first assessed deformation index value with respect to the first deformation index equation. As an example, the optimization algorithm may be a genetic algorithm, but this disclosure is not limited in this respect. In this embodiment, the acquired first optimal coordinate set is (724.627, −2057.14, −925). It should be noted that it is possible for one or more of the coordinate values of the first optimal coordinate set acquired based on the first deformation index equation to not fall within the corresponding one or more of the first, second and third coordinate intervals. In this embodiment, when a coordinate set that corresponds to the minimum first assessed deformation index value with respect to the first deformation index equation has a coordinate value outside of the corresponding coordinate interval, that coordinate value may be adjusted to be one of the upper limit and the lower limit of the corresponding coordinate interval that is closer to the coordinate value, so as to obtain the first optimal coordinate set. However, this disclosure is not limited in this respect.

In step S64, the computer device determines whether or not each of the coordinate values of the first optimal coordinate set falls within the corresponding one of the first, second and third coordinate intervals. As an example where the first optimal coordinate set is represented by ($Ax_0$, $Bx_0$, $By_0$), the computer determines whether $724.627 < Ax_0 < 975$, $-2650 < Bx_0 < -2057.14$, and $-925 < By_0 < -749.399$. Upon determining that any one of the coordinate values of the first optimal coordinate set does not fall within the corresponding one of the first, second and third coordinate intervals, the flow goes to step S65. Upon determining that each of the coordinate values of the first optimal coordinate set falls within the corresponding one of the first, second and third coordinate intervals, the flow goes to step S71, where multiple support components configured for supporting the machine tool 100 are installed to a bottom of the base 1 respectively at the first, second and third supporting points that correspond to the first optimal coordinate set. In this embodiment, since any coordinate value that falls outside of the corresponding coordinate interval and that corresponds to the minimum first assessed deformation index value is already adjusted to be one of the upper limit and the lower limit of the corresponding coordinate interval that is closer to the coordinate value for obtaining the first optimal coordinate set, the computer device determines whether each of the coordinate values of the first optimal coordinate set falls within the corresponding one of the first, second and third coordinate intervals by determining, for each of the coordinate values of the first optimal coordinate set, whether or not the coordinate value is equal to one of the upper limit and the lower limit of the corresponding one of the first, second and third coordinate intervals. In this embodiment, the first optimal coordinate set is (724.627, −2057.14, −925), in which the coordinate values are equal to the lower limit of the first coordinate interval (724.627, 975), the upper limit of the second coordinate interval (−2650, −2057.14) and the lower limit of the third coordinate interval (−925, −749.399), respectively, the computer device determines that each of the coordinate values thereof falls outside of the corresponding one of the first, second and third intervals, and the step goes to step S65.

In step S65, the computer device converts, based on the upper limit and the lower limit of each of the first, second and third coordinate intervals, the test coordinate sets respectively into a plurality of converted test coordinate sets that respectively correspond to the first deformation index values. Each of the converted test coordinate sets has multiple (three) coordinate values respectively corresponding to those of each of the test coordinate sets, and are denoted by Ax', Bx', and By', as shown in Table 1. In this embodiment, the upper limit of each of the first, second and third coordinate intervals is converted into 1, the lower limit of each of the first, second and third coordinate intervals is converted into −1, and the average of the lower limit and the upper limit for each of the first, second and third coordinate intervals is converted into 0. In other words, each of the first, second and third coordinate intervals is normalized to be an interval between −1 and 1.

In step S66, the computer device acquires, based on the converted test coordinate sets and the corresponding first deformation index values, a second deformation index equation that is used to calculate a second assessed deformation index value in response to an arbitrary coordinate set for the first, second and third supporting points. In this embodiment, the acquired second deformation index equation is represented by:

$$Z = 25.21 + 2.91 \times A'_x - 10.48 \times B'_x + 0.67 \times B'_y - \\ 0.88 \times A'_x \times B'_x - 0.061 \times A'_x \times B'_y + 0.12 \times B'_x \times B'_y + \\ 0.27 \times A'_x \times A'_x - 2.11 \times B'_x \times B'_x + 0.078 \times B'_y \times B'_y \quad (3)$$

In step S67, the computer device updates the test coordinate sets based on a basis coordinate set, the second deformation index equation, and the first, second and third coordinate intervals, where the basis coordinate set includes multiple (three) coordinate values that respectively fall within the first, second and third coordinate intervals. In this embodiment, the basis coordinate set is one of the test coordinate sets acquired in step S60, but this disclosure is not limited in this respect. Particularly, the test coordinate set (849.814, −2353.57, −837.200) that corresponds to the converted test coordinate set (0, 0, 0) (see the coordinate set No. 15 in Table 1) is selected as the basis coordinate set in this embodiment.

Figure 9:
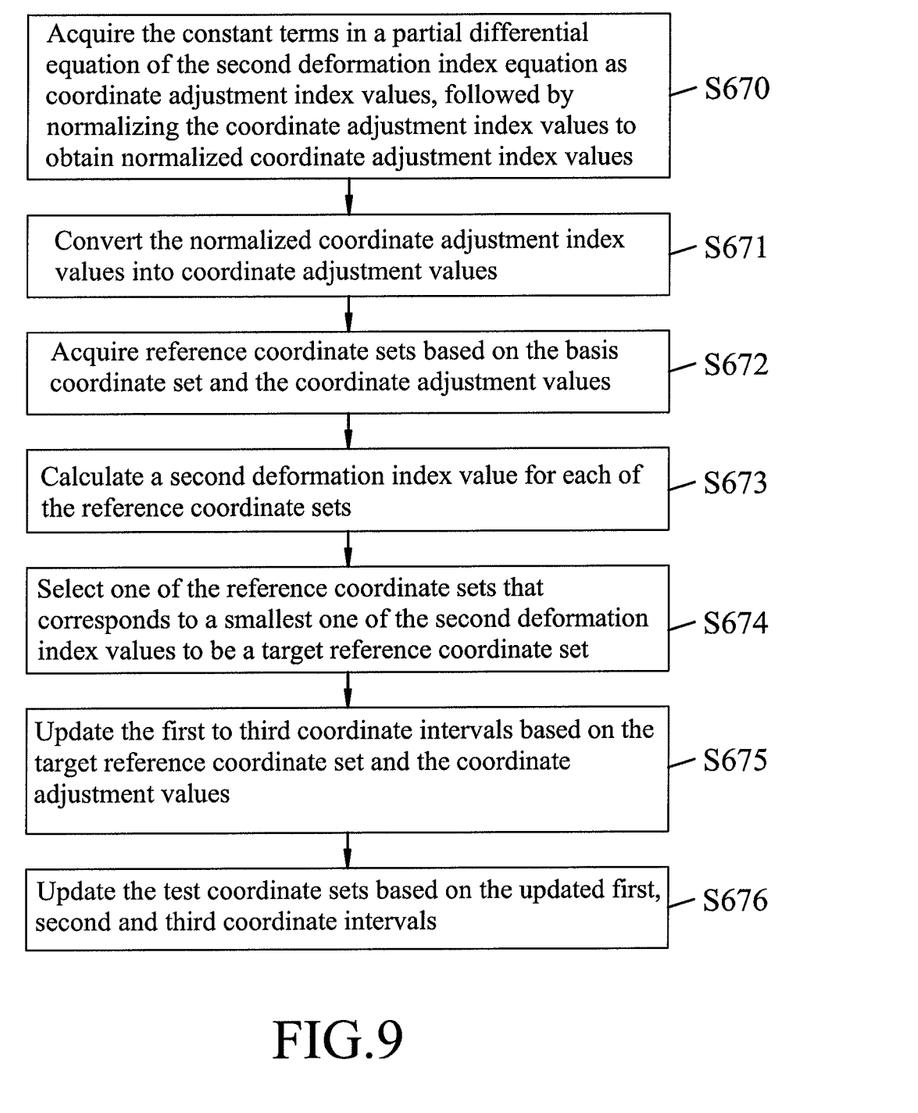
FIG. 9 is a flow chart illustrating sub-steps of step S67 shown in FIG. 8.

Referring to FIG. 9, step S67 includes sub-steps S670 to S676 in this embodiment.

In sub-steps S670 and S671, the computer device acquires, based on the second deformation index equation, a set of coordinate adjustment values that respectively correspond to the first, second and third coordinate intervals. In detail, the set of the coordinate adjustment values is acquired based on a partial differential equation of the second deformation index equation with respect to a variable (Ax') relating to the first coordinate interval, a variable (Bx') relating to the second coordinate interval, and a variable (By') relating to the third coordinate interval. In sub-step S670, the computer device acquires the constant terms in the partial differential equation of the second deformation index equation as coordinate adjustment index values, followed by normalizing the coordinate adjustment index values to obtain normalized coordinate adjustment index values. In this embodiment, the partial differential equation of the second deformation index equation is represented by:

$$\nabla Z = \left( \frac{\partial Z}{\partial A'_x}, \frac{\partial Z}{\partial B'_x}, \frac{\partial Z}{\partial B'_y} \right) \quad (4)$$
$$= \begin{pmatrix} 0.54 A'_x - 0.88 B'_x - 0.061 B'_y + 2.91, \\ 0.12 B'_y - 4.22 B'_x - 0.88 A'_x - 10.48, \\ 0.12 B'_x - 0.061 A'_x + 0.156 B'_y + 0.67 \end{pmatrix}$$

Accordingly, the coordinate adjustment index values are represented as (2.91, −10.48, 0.67), and the normalized coordinate adjustment index values are represented as (2.91/−10.48, −10.48/−10.48, 0.67/−10.48)=(−0.2777, 1, −0.0639).

In sub-step S671, the computer device converts, based on the basis coordinate set and the first, second and third coordinate intervals, the normalized coordinate adjustment index values into the coordinate adjustment values. In this embodiment, the normalized coordinate adjustment index values (−0.2777, 1, −0.0639) are converted into the coordinate adjustment values (−17.38, 148.22, −2.81) that correspond to the first deformation equation based on, but not limited to, the upper limits of the first, second and third coordinate intervals by:

$$-0.2777 \Rightarrow \frac{975 - 849.814}{2} \times (-0.2777) = -17.38 \quad (5)$$

$$1 \Rightarrow \frac{-2057.14 - (-2353.57)}{2} \times 1 = 148.22 \quad (6)$$

$$-0.0639 \Rightarrow \frac{-749.399 - (-837.200)}{2} \times (-0.0639) = -2.81 \quad (7)$$

In sub-step S672, the computer device acquires a plurality of the reference coordinate sets based on the basis coordinate set and the coordinate adjustment values, where each of the reference coordinate sets includes multiple (three) coordinate values that respectively correspond to the first, second and third coordinate intervals. In this embodiment, the reference coordinate sets are acquired as listed in Table 2 (BCS+K to BCS+9K).

TABLE 2

|  | ax | bx | by | z |
|---|---|---|---|---|
| Basis coordinate set (BCS) | 849.814 | −2353.57 | −837.20 |  |
| Coordinate adjustment value (K) | −17.38 | 148.22 | −2.81 |  |
| BCS + K | 832.43 | −2205.36 | −840.01 | 19.28 |
| BCS + 2 K | 815.05 | −2057.14 | −842.81 | 12.15 |
| BCS + 3 K | 797.67 | −1908.93 | −845.62 | 4.86 |
| BCS + 4 K | 780.29 | −1760.71 | −848.43 | 9.13 |
| BCS + 5 K | 762.91 | −1612.50 | −851.23 | 20.13 |
| BCS + 6 K | 745.53 | −1464.28 | −854.04 | 34.17 |
| BCS + 7 K | 728.15 | −1316.07 | −856.85 | 51.49 |
| BCS + 8 K | 710.77 | −1167.85 | −859.65 | 72.34 |
| BCS + 9 K | 693.39 | −1019.64 | −862.46 | 96.99 |

In sub-step S673, the computer device uses, but not limited to, the finite element static force analysis to calculate, for each of the reference coordinate sets, a second deformation index value (as listed in a column of "z" in Table 2) that corresponds to the guide rail member unit and that relates to assessment of a deformation level of the guide rail unit based on the reference coordinate set, the machine tool model 101 and the component weight information.

In sub-step S674, the computer device selects one of the reference coordinate sets that corresponds to a smallest one of the second deformation index values to be a target reference coordinate set. In this embodiment, the reference coordinate set (797.67, −1908.93, −845.62) which corresponds to the smallest second deformation index value of 4.86 is selected to be the target reference coordinate set.

In sub-step S675, the computer device updates the first, second and third coordinate intervals based on the target reference coordinate set and the coordinate adjustment values. In this embodiment, the first, second and third coordinate intervals are updated by (BCS+3K)±K, where (BCS+3K) is the target reference coordinate set.

In other words, the first coordinate interval is updated as (797.61+(−17.38), 7979.67−(−17.38))=(780.29, 815.05), the second coordinate interval is updated as (−1908.93−148.22, −1908.93+148.22)=(−2057.14, −1760.71), and the third coordinate interval is updated as (−845.62+(−2.81), −845.62−(−2.81))=(−848.43, −842.81).

In sub-step S676, the computer device uses, but not limited to, the CCD to update the test coordinate sets based on the first, second and third coordinate intervals updated in sub-step S657, as exemplified in columns Ax", Bx" and By" in Table 3.

TABLE 3

| No. | Ax" | Bx" | By" | Z' |
|---|---|---|---|---|
| 1 | 780.292 | −2057.14 | −848.426 | 11.5952 |
| 2 | 815.053 | −2057.14 | −848.426 | 12.0528 |
| 3 | 780.292 | −1760.71 | −848.426 | 9.1361 |
| 4 | 815.053 | −1760.71 | −848.426 | 8.8363 |
| 5 | 780.292 | −2057.14 | −842.813 | 11.6158 |
| 6 | 815.053 | −2057.14 | −842.813 | 12.1335 |
| 7 | 780.292 | −1760.71 | −842.813 | 9.0352 |
| 8 | 815.053 | −1760.71 | −842.813 | 8.8064 |
| 9 | 780.292 | −1908.93 | −845.619 | 4.7542 |
| 10 | 815.053 | −1908.93 | −845.619 | 5.0510 |
| 11 | 797.672 | −2057.14 | −845.619 | 11.8383 |
| 12 | 797.672 | −1760.71 | −845.619 | 8.9945 |
| 13 | 797.672 | −1908.93 | −848.426 | 4.9181 |
| 14 | 797.672 | −1908.93 | −842.813 | 4.9343 |
| 15 | 797.672 | −1908.93 | −845.619 | 4.8769 |

Then, the computer device may use the test coordinate sets updated in sub-step S676 to repeat steps S61-S63 (see FIG. 7) as steps S68-S70 (see FIG. 8) to acquire a second optimal coordinate set.

Referring to FIG. 8 again, in step S68, the computer device uses, but not limited to, the finite element static force analysis to calculate, for each of the test coordinate sets updated in sub-step S676, a third deformation index value (as listed in column Z' in Table 3) that corresponds to the guide rail member unit (i.e., the first and second guide rail members 110, 120) and that relates to assessment of a deformation level of the guide rail unit (i.e., the first and second guide rails 11, 12) based on the updated test coordinate set, the machine tool model 101 and the component weight information.

In step S69, the computer device uses, but not limited to, the response surface methodology to acquire, based on the updated test coordinate sets and the corresponding third deformation index values calculated in step S68, a third deformation index equation that is used to calculate a third assessed deformation index value in response to an arbitrary coordinate set for the first, second and third supporting points.

In step S70, the computer device uses an optimization algorithm to calculate a second optimal coordinate set for the first, second and third supporting points based on the third deformation index equation, where the second optimal coordinate set corresponds to a minimum third assessed deformation index value with respect to the third deformation index equation.

In step S72, the support components configured for supporting the machine tool 100 are installed to the bottom of the base 1 respectively at the first, second and third supporting points that correspond to the second optimal coordinate set.

In some embodiments, the method according to the embodiments of this disclosure may be implemented as one or more modules in executable software as a set of logic instructions stored in a machine-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. In some embodiments, the method may be implemented using hardware elements, software elements or a combination of both, and examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In summary, the method for determining locations of supporting points for a machine tool according to this disclosure uses the test coordinate sets and the corresponding deformation index values to obtain a deformation index equation, thereby calculating an optimal coordinate set. In a case that the optimal coordinate set does not completely fall within the first, second and third coordinate intervals, a set of coordinate adjustment values is calculated based on the deformation index equation, and then multiple reference coordinate sets are obtained based on a basis coordinate set and the coordinate adjustment values. The reference coordinate sets are used in cooperation with the corresponding deformation index values to acquire another deformation index equation, so that the optimal coordinate set may be updated based on said another deformation index equation. By use of such algorithm, the optimal coordinate set may be found in an objective and scientific manner, ensuring good locations of the supporting points for the machine tool.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for determining locations of supporting points for a machine tool, comprising steps of:
providing the machine tool that includes a base provided with a guide rail unit, and a plurality of components disposed on the base;

providing a computer device that stores:
- a machine tool model that relates to the machine tool and that includes a plurality of model members respectively corresponding to the base and the components of the machine tool, the model members including a guide rail member unit that corresponds to the guide rail unit;
- component weight information for the model members, the component weight information relating to weights of the base and the components of the machine tool;
- a first coordinate interval defined with respect to a first axis in relation to the machine tool model, the first coordinate interval relating to a location of a first supporting point to be determined for the machine tool model with respect to the first axis;
- a second coordinate interval defined with respect to the first axis, the second coordinate interval relating to locations of a second supporting point and a third supporting point to be determined for the machine tool model with respect to the first axis; and
- a third coordinate interval defined with respect to a second axis transverse to the first axis in relation to the machine tool model, the third coordinate interval relating to locations of the second and third supporting points for the machine tool model with respect to the second axis;

acquiring a plurality of test coordinate sets for the first, second and third supporting points based on the first coordinate interval, the second coordinate interval and the third coordinate interval, each of the test coordinate sets including multiple coordinate values that conform to the first, second and third coordinate intervals, respectively;

calculating, by the computer device for each of the test coordinate sets, a first deformation index value that corresponds to the guide rail member unit and that relates to assessment of a deformation level of the guide rail unit based on at least one of the plurality of test coordinate sets, the machine tool model and the component weight information;

acquiring, by the computer device and based on the test coordinate sets and the corresponding first deformation index values, a first deformation index equation that is used to calculate a first assessed deformation index value in response to an arbitrary coordinate set for the first, second and third supporting points;

calculating, by the computer device, an optimal coordinate set for the first, second and third supporting points based on the first deformation index equation, the optimal coordinate set corresponding to a minimum first assessed deformation index value with respect to the first deformation index equation; and installing support components for the machine tool respectively at the first, second and third supporting points corresponding to the optimal coordinate set.

2. The method of claim 1, wherein the optimal coordinate set includes multiple coordinate values that correspond to the first coordinate interval, the second coordinate interval and the third coordinate interval, respectively; and
wherein each of the first, second and third coordinate intervals has an upper limit and a lower limit;
said method further comprising, after the step of calculating the optimal coordinate set, steps of:
- determining, by the computer device, whether or not each of the coordinate values of the optimal coordinate set falls within the corresponding one of the first, second and third coordinate intervals;
- upon determining that any one of the coordinate values of the optimal coordinate set does not fall within the corresponding one of the first, second and third coordinate intervals, converting, by the computer device and based on the upper limit and the lower limit of each of the first, second and third coordinate intervals, the test coordinate sets respectively into a plurality of converted test coordinate sets that respectively correspond to the first deformation index values;
- acquiring, by the computer device and based on the converted test coordinate sets and the corresponding first deformation index values, a second deformation index equation that is used to calculate a second assessed deformation index value in response to an arbitrary coordinate set for the first, second and third supporting points;
- updating, by the computer device, the test coordinate sets based on a basis coordinate set, the second deformation index equation, and the first, second and third coordinate intervals, the basis coordinate set including multiple coordinate values that respectively fall within the first, second and third coordinate intervals; and
- repeating, by the computer device and using the test coordinate sets thus updated, the steps of:
    - calculating the first deformation index values;
    - acquiring the first deformation index equation; and
    - calculating the optimal coordinate set;
wherein the step of installing the support components is performed based on the optimal coordinate set calculated based on the test coordinate sets thus updated.

3. The method of claim 2, wherein the step of updating the test coordinate sets includes:
- acquiring a plurality of reference coordinate sets based on the basis coordinate set and the coordinate adjustment values, each of the reference coordinate sets including multiple coordinate values that respectively correspond to the first, second and third coordinate intervals;
- calculating, for each of the reference coordinate sets, the second deformation index value that corresponds to the guide rail member unit and that relates to assessment of the deformation level of the guide rail unit based on the reference coordinate set, the machine tool model and the component weight information;
- selecting one of the reference coordinate sets that corresponds to a smallest one of the second deformation index values to be a target reference coordinate set;
- updating the first, second and third coordinate intervals based on the target reference coordinate set and the coordinate adjustment values; and
- updating the test coordinate sets based on the first, second and third coordinate intervals thus updated.

4. The method of claim 3, wherein the set of the coordinate adjustment values is acquired based on a partial differential equation of the second deformation index equation with respect to variables relating to the first, second and third coordinate intervals, respectively.

5. The method of claim 2, wherein the basis coordinate set is one of the test coordinate sets that are not yet updated.

6. The method of claim 1, wherein the test coordinate sets are acquired using central composite design.

7. The method of claim 1, wherein the first deformation index value that corresponds to a respective one of the test coordinate sets is calculated using finite element static force analysis.

8. The method of claim 1, wherein the optimal coordinate set is acquired using a genetic algorithm.

9. The method of claim 1, wherein the first deformation index equation is acquired using response surface methodology.

* * * * *